United States Patent [19]

Venema

[11] 3,852,234
[45] Dec. 3, 1974

[54] PROCESS AND APPARATUS FOR DISSOLVING WATER SOLUBLE POLYMERS AND GUMS IN WATER INVOLVING INVERSION OF WATER-IN-OIL EMULSIONS

[75] Inventor: Gerard J. Venema, Oak Park, Ill.

[73] Assignee: Nalco Chemical Company, Chicago, Ill.

[22] Filed: Feb. 28, 1972

[21] Appl. No.: 229,827

[52] U.S. Cl. .................. 260/29.6 H, 260/29.6 PM
[51] Int. Cl. .................. C08f 47/16, C08f 47/18
[58] Field of Search ............. 260/29.6 PM, 29.6 H

[56] References Cited
UNITED STATES PATENTS 3,286,992  11/1966  Armeniades et al. .............. 259/4
3,624,019  12/1970  Anderson ..................... 260/29.6

OTHER PUBLICATIONS

Kenics Bulletin, No. KB471, May 1971, Kenics corp., Danvers, Mass.
Kenics Bulletin, KMOD–10, Kenics Corp., Danvers, Mass., Sept. 1971.
"The Structure of Polymers," M. Miller, pp. 202–203, Reinhold Book Corp., 1966.
T. Bor, "The Static Mixer as a Chemical Reactor," British Chemical Engineering, July, 1971.

Primary Examiner—William H. Short
Assistant Examiner—Peter F. Kulkosky
Attorney, Agent, or Firm—Johnston, Keil, Thompson & Shurtleff

[57] ABSTRACT

Water soluble vinyl addition polymers and gums are rapidly dissolved in water by first dispersing these polymers or gums into a water-in-oil emulsion, then mixing the water-in-oil emulsion with water, preferably in the presence of a surfactant, and inverting the emulsion by passing a confined stream of the resultant mixture in a tortuous path to produce turbulence so that the water soluble addition polymer or gum is released into the water as a solution.

5 Claims, 1 Drawing Figure

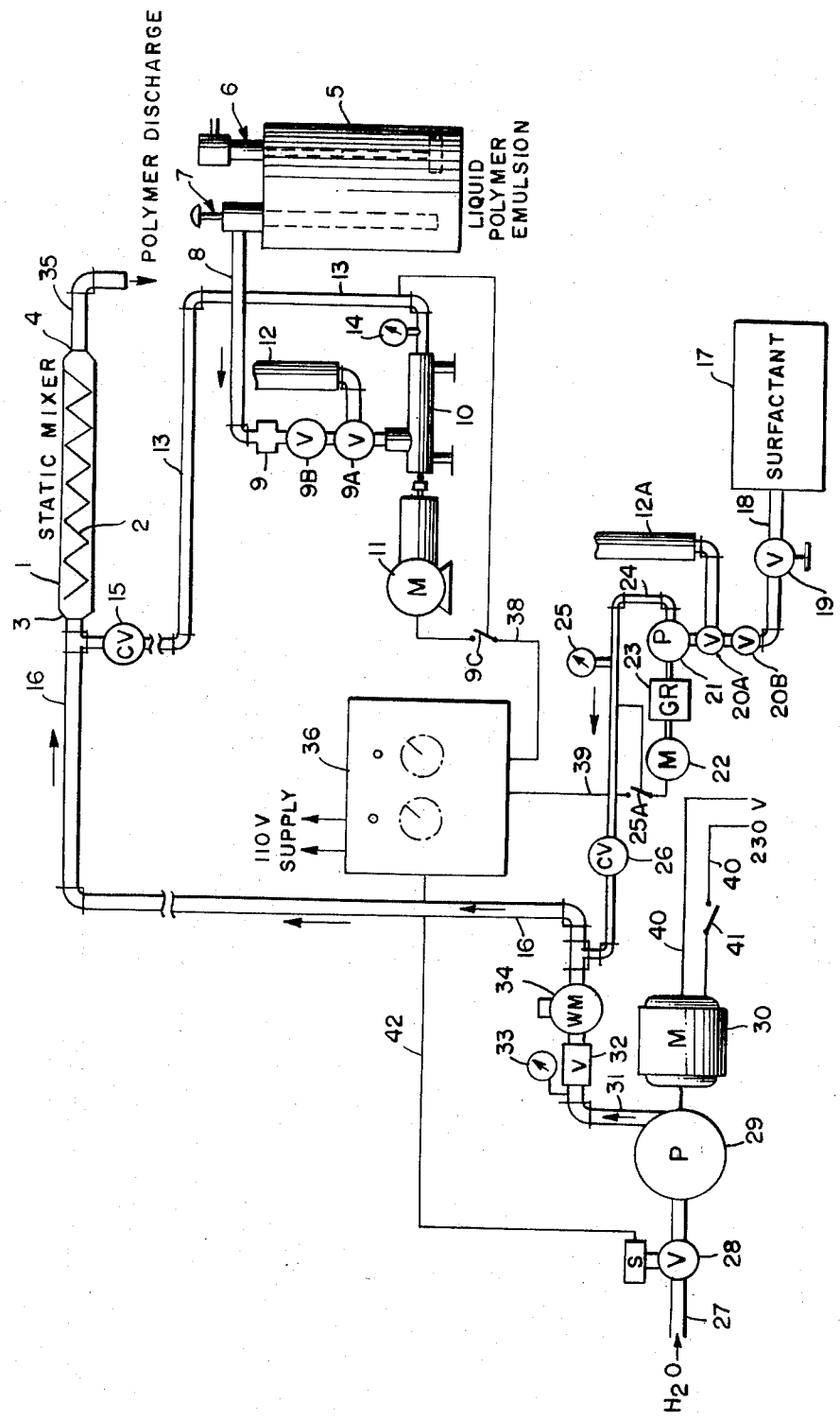

PROCESS AND APPARATUS FOR DISSOLVING WATER SOLUBLE POLYMERS AND GUMS IN WATER INVOLVING INVERSION OF WATER-IN-OIL EMULSIONS

BACKGROUND

Various synthetic and naturally occurring water soluble polymers have been developed which exhibit, in aqueous solution, superior thickening and flocculating properties. These polymers are being used increasingly in a number of commercial applications such as, for example, in the clarification of aqueous solutions, in papermaking operations, in the treatment of sewage and industrial wastes, as stabilizers for drilling muds, and in the secondary recovery of petroleum by waterflooding.

Although these polymers are most often available commercially as powders or as a finely divided solid, they are most frequently utilized as aqueous solutions. This necessitates that the solid polymer material be dissolved in water. Although the various polymers are more or less soluble in water, difficulty is often experienced in preparing aqueous polymer solutions because of their slow dissolution and because the solid polymer is not readily dispersible in water. Furthermore, dispersion of solid polymers in water is hindered by their tendency to clump or remain as agglomerates on contact with water. Lumps of solid polymer immediately form by the encapsulation of undissolved solids in an outer coating of water-wet polymer which retards the penetration of additional water into the agglomerate. Although many of these lumps are eventually dissolved by continued agitation, it is frequently impractical to agitate the solution for a sufficiently long period to obtain complete dissolution.

In U.S. Pat. No. 3,624,019, a process is disclosed whereby water soluble addition polymers and gums may be rapidly dissolved or dispersed in water by first preparing a water-in-oil emulsion which contains dispersed therein finely divided particles of the water soluble vinyl addition polymer or gum, thereby producing what may be termed a polymer-containing emulsion, and then inverting the polymer-containing emulsion in water whereby the water soluble vinyl addition polymer or gum is released into the water as a solution. In this way, an aqueous solution of a polymer or gum can be obtained which is active for coagulating and settling finely suspended solids from aqueous suspensions and for numerous other commercial applications of the type previously mentioned.

It would be desirable to provide a process and apparatus wherein said activation of the polymer or gum can be carried out continuously in a very simple manner.

OBJECTS

With the foregoing considerations in mind, one of the objects of the present invention is to provide a new and improved process and apparatus for dispersing water soluble vinyl addition polymers and gums in water in a simple and continuous manner so that the vinyl addition polymer or gum is released into the water as a solution and the resultant activated solution can be readily employed for one or more of the commercial applications previously mentioned.

Another object of the invention is to provide a process and apparatus for continuous in-line activation of a liquid polymer in apparatus which is relatively simple and inexpensive and can be operated with a minimum of maintenance difficulty.

A further object of the invention is to provide a process and apparatus of the type described in which water soluble vinyl addition polymers and gums can be dissolved in water in a very short period of time.

Other objects and advantages of the invention will appear from the following description in conjunction with the accompanying drawing in which:

The single FIGURE illustrates diagrammatically an apparatus embodying the invention.

BRIEF SUMMARY OF THE INVENTION

The invention is based upon the discovery that the dissolution of water soluble vinyl addition polymers and gums in water by a process wherein a water-in-oil emulsion, which contains finely divided water soluble vinyl addition polymer or gum, is inverted in the water so that the water soluble vinyl addition polymer or gum is released into the water as a solution can be facilitated by mixing said water-in-oil emulsion with water, preferably in the presence of a surfactant, and passing a confined stream of the resultant mixture in a tortuous or winding path so as to produce sufficient turbulence to invert said water-in-oil emulsion and to release said polymer or gum in water to produce an aqueous solution of said polymer or said gum.

DETAILED DESCRIPTION OF THE INVENTION

In practicing the invention, optimum results have been obtained by using a Static Mixer, for example, a Kenics Static Mixer. The Kenics Static Mixer is a section of pipe containing a set number of helical elements. Each element splits the flow and the total number of flow splits is $2^n$ where $n$ is the number of elements in the Static Mixer. In a conventional Kenics Static Mixer the usual number of helical elements is 21 but in the present invention it is possible to use a smaller number of helical elements, for example, three, six or 12.

Another important factor in the development of full polymer activity according to the practice of the present invention depends upon the dimensionless Reynolds No. for the pipe flow through the Static Mixer. The Reynolds Number indicates the degree of turbulence of the flow in a pipe, and is calculated as $N_{Re} = \rho VD/\mu$, where $\rho$ is fluid density, $\mu$ is viscosity, $V$ is linear velocity, and $D$ is the pipe inner diameter.

Usually, with the Reynolds Number between 2,000 and 10,000, the flow is laminar to turbulent and with a Reynolds Number over 20,000, the flow is in the turbulent range. For the purpose of the present invention it is desirable to have a flow through the Static Mixer as indicated by the Reynolds number of at least 50,000. A flow corresponding to a lower Reynolds number can give an active polymer solution but usually the optimum activity is not obtained. Usually, moreover, if an active polymer solution, i.e., a solution of the polymer in water, is not obtained initially, continued mixing will not help.

As shown in the drawing, an apparatus suitable for the practice of the invention comprises a Kenics Static Mixer 1 containing helical elements 2 and having an inlet end 3 and an outlet end 4.

A liquid polymer emulsion as hereinafter described in more detail is stored in drum 5 which is equipped with a stirrer or agitator 6 and a hand pump 7. Instead of a single drum 5, a second and a third drum can be used in parallel arrangement, the second drum being a primary feed drum and the third drum a standby feed drum. Alternatively, the emulsion can be fed by gravity from an overhead storage. A tube or conduit 8 is connected to drum 5 through hand pump 7 so as to permit the removal of the contents of drum 5 in proportional amounts through conduit 8 and manifold 9 to pump 10 operated by motor 11. If there are several drums they are usually connected separately by conduits directly to manifold 9. A flow tube 12 is connected to single valve 9A so that the flow of the liquid polymer emulsion through tube 8 can be indicated. Flow is controlled by single valve 9B. The outlet of pump 10 is connected to a pipe or tube 13 provided with a pressure gauge 14. A pressure sensitive "no flow switch" 9C is connected to the feed line 13 after pressure gauge 14 to electrically shut off motor 11 to the polymer pump 10 when no polymer is in pipe 13. The pipe 13 is connected via a check valve 15 to conduit 16 which in turn is connected to the inlet end 3 of Static Mixer 1.

A surfactant from storage container 17 is passed through conduit or tube 18 controlled by valve 19, then through valves 20A and 20B to pump 21 operated by motor 22 through a gear reducer 23. In some applications, the polymer feed pump 10 may require the use of a gear reducer. A flow indicator 12A is connected to valve 20A. From pump 21 said surfactant is passed through conduit or pipe 24 past pressure gauge 25 and through check valve 26 to conduit 16 where it is mixed with water. A "no-flow switch" 25A is connected to feed line 24 after pressure gauge 25 to electrically shut off pump 21 when there is no surfactant solution in feed line 24.

The water which is mixed with the surfactant is introduced into water line 27 controlled by valve 28 and is pumped by pump 29 operated by motor 30 through conduit 31, which in turn is controlled by valve 32. Valve 32 has a pressure sensitive adjustable orifice which provides a constant flow of water from pump 29. Pump 29 usually operates at a fixed speed and has no electrical speed control. If the inlet water pressure through feed line 27 is high enough, the water can by-pass pump 29. A pressure gauge 33 and a water meter 34 are also provided and connected to line 31 so that the pressure and volume of the water can be indicated and regulated. The amount of surfactant is proportioned into the water and allowed to mix in-line before the polymer is added from conduit 13. The resulting activated polymer solution discharging from the Static Mixer through line 35 develops full activity within a few minutes and requires no additional agitation.

In the previously described system, the several components of the apparatus, viz., the pumps 10, 21 and 29, motors 11, 22 and 30, manifold 9, valves 9A, 9B, 19, 20A, 20B, 26, 28 and 32, gear reducer 23, water meter 34, gauges 14, 25 and 33, flow tubes 12 and 12A, panel board 36, the various wiring connections and conduits 24, 27, 31 and portions of conduits 13, 16 and 18 can be mounted on a skid or other suitable support. The conduits 13, 18, 27 and 16 can be hose connected to containers 5, 17, a source of water supply, and the Static Mixer 1, respectively.

In the embodiment illustrated, control panel 36 is connected by suitable electrical connections 38, 39, 42 to motor 11, motor 22, and valve 28, respectively.

Motor 30 is connected through lines 40, 40 controlled by switch 41 (which can also be in panel 36) to a 230 volt A.C. electrical source. Both pump 10 and pump 21 have independent electrical variable speed drives with the controls located in panel 36. It will be recognized that various changes and modifications can be made in the electrical system without departing from the invention.

The invention will be further illustrated but is not limited by the following example in which the proportions are given in parts by weight, unless otherwise indicated.

EXAMPLE

Using a system as described in the drawing, a liquid polymer emulsion consisting essentially of a 70 percent acrylamide-30 percent acrylic acid polymer emulsified in 50 percent by weight water and 50 percent by weight oil (ISOPAR M) to form an emulsion containing 34 percent by weight of said polymer with a polymer particle size range of 10 microns to 1 mm was placed in container 5 and a non-ionic surfactant (Triton CF76) was placed in container 17. Water was introduced through conduit 27 controlled by valve 28 and pumped through line 31, valve 32, water meter 34 and line 16. Simultaneously, surfactant from container 17 was introduced into line 18 controlled by valve 19 and valves 20A and 20B and pumped by pump 31 through conduit 24 and valve 26 to conduit 16 where it was mixed with water flowing through said conduit.

The liquid polymer emulsion from container 5 was pumped by means of pump 10 through conduit 13 and valve 15 to conduit 16 where it was mixed with the surfactant-water solution, just ahead of Static Mixer 1. Static Mixer 1 was approximately 18 inches long, had an inner diameter of 1 inch and was equipped with 12 helical elements. The quantity of surfactant was proportioned into conduit 16 so as to constitute about 2 percent by weight of the polymer. The flow rate through conduit 16 was approximately 25 gallons per minute and the Reynolds number was approximately 50,000. The pressure drop across the Static Mixer was approximately 20–25 psig. This can very depending upon various factors but usually should be within the range of 5–40 psig.

The activity (as indicated by standard BOF settling tests) and viscosity (as indicated by a standard Brookfield Model LVF viscometer) of the activated polymer solution at 0.75 percent polymer by weight developed within 20 minutes after passing through the Kenics Static Mixer. The viscosity was then about 2,500 cps. at 25°C. Other tests have indicated that full viscosity development occurs between 10 and 20 minutes after passing through the Static Mixer. The average residence time of the solution in the Kenics Static Mixer is less than 1 second and the polymer solution usually does not develop viscosity until after leaving the Static Mixer. Thus, the viscosity of the solution in the Static Mixer is usually approximately that of water alone, or about 1 centipoise.

In a similar manner other water soluble polymers were dissolved in water. Specific examples of such polymers and water-in-oil emulsions of such polymers are given in U.S. Pat. No. 3,624,019, Table II, together with examples of surfactants that can be used in the practice of this invention to cause the release of the polymer from the water-in-oil emulsion and its dissolution in water. The latter surfactant can be included in the polymer emulsion in some cases.

Usually, if a surfactant or activator is employed to assist in inverting the emulsion, the amount employed for the purpose of the invention will be within the range of 1.75 to 10 percent by weight of the polymer, although the range may be somewhat broader as hereinafter described.

The amount of the polymer in the final aqueous solution will be governed to a considerable extent by the viscosity desired. Usually the viscosity will be within the range of 2,000 to 2,500 cps at 25°C. However, the viscosity can be reduced by further mixing without reducing the activity. Thus, the viscosity might be reduced to 1,500 cps or below at 25°C. without reduction in activity of the polymer solution.

Other types of liquid polymers than that used in the Example may require a Reynolds number different from 50,000. The more difficult the polymer is to put into a water solution, the higher the Reynolds number that will be required to develop full polymer activity.

The water soluble vinyl addition polymers are well known to the art and have been described in numerous publications and patents. The polymers most commonly used in many industrial applications are acrylamide polymers which include polyacrylamide and its water soluble copolymeric derivatives such as, for instance, acrylamide-acrylic acid, and acrylamide-acrylic acid salt copolymers which contain from about 95 to 5 percent by weight of acrylamide. Also useful are copolymers of acrylamide with other vinyl monomers such as maleic anhydride, acrylonitrile, styrene and the like. It is preferred in the practice of this invention to use acrylamide polymers which are water soluble and which contain at least 5 percent by weight of acrylamide.

Other water soluble vinyl polymers are described in detail in the following U.S. patents: U.S. Pat. Nos. 3,418,237, 3,259,570 and 3,171,805.

In examining the disclosures of these patents it will be seen that the water soluble polymers may be either cationic or anionic and, in some instances, the ionic charges are sufficiently slight so that the polymers may be considered as non-ionic.

For example, water soluble polymers and copolymers of allyl amine, diallyl amines, or dimethylaminoethylmethacrylate are cationic. Polymers such as polyvinyl alcohol are nonionic, and polymers such as polyacrylic acid or polystyrene sulfonates are anionic. All of these polymers may be used in the practice of the invention.

The molecular weight of the polymers described above may vary over a wide range, e.g., 10,000 to 25,000,000. The invention, however, finds its greatest usefulness in preparing aqueous solutions or dispersions of these polymers and, in particular, acrylamide polymers whose molecular weights are in excess of 1,000,000. Polymers having higher molecular weights are more difficultly dissolved in water and tend to form extremely viscous solutions at relatively low concentrations. Also, the polymers may be produced by any known methods of conducting polymerization reactions. Thus, solution suspension or emulsion polymerization techniques may be used.

The gums are well known water soluble polymers and are described in Vol. 10 of the Encyclopedia of Chemical Technology, 2nd Edition, Interscience Publishers, 1966.

The invention is capable of producing rapidly aqueous solutions of the water soluble vinyl addition polymers or gums having concentrations within the range of 0.1 to 20 percent by weight. The invention most often finds usefulness when it is desired to form aqueous solutions of polymers having a solution concentration of 0.2 to 2.0 percent by weight.

The water-in-oil emulsions may be prepared by any number of known techniques. The oils used in preparing these emulsions may be selected from a large group of organic liquids which include liquid hydrocarbons and substituted liquid hydrocarbons.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch chain isoparaffinic solvent sold by Humble Oil & Refining Company under the Tradename ISOPAR M. Typical specifications of this narrow-cut isoparaffinic solvent are set forth below in the following table:

TABLE

| Specification Properties | Minimum | Maximum | Test Method |
| --- | --- | --- | --- |
| Gravity, API at 60/60°F. | 48.0 | 51.0 | ASTM D 287 |
| Color, Saybold | 30 | — | ASTM D 156 |
| Aniline point, °F. | 185 | — | ASTM D 611 |
| Sulfur, ppm | — | 10 | ASTM D 1266 (Nephelometric mod.) |
| Distillation, °F. | | | ASTM D 86 |
| IBP | 400 | 410 | |
| Dry point | — | 495 | |
| Flash point, °F (Pensky-Martens closed cup) | 160 | — | ASTM D 93 |

The amount of oil used in relation to the water to prepare the emulsion may be varied over wide ranges. As a general rule, the amount of oil-to-water may vary between 5:1 – 1:10 with preferable emulsions being prepared in the ratio of 1:2 to 1:10. These ratios are illustrative of emulsions that can be prepared, although it should be understood that the invention is not limited thereby.

The emulsions may be prepared by any number of techniques. For example, the emulsions may be prepared by using high speed agitation or ultrasonic techniques. In most instances, however, it is desirable that the emulsion be a stable emulsion and to achieve this end it is often necessary to employ an oil soluble emulsifying agent. The amount of emulsifying agent to provide an emulsion will have to be determined by routine experimentation. As a general rule it may be said that the amount of oil soluble emulsifier may range from 0.1 to 30 percent by weight based on the weight of the oil. To produce stable emulsions the amount of emulsifier will normally be within the range of 12 to 20 percent by weight of the oil.

Rather than provide a listing of suitable emulsifiers, it may be stated that it is generally satisfactory to use the so-called low HLB materials which are well documented in the literature and are summarized in the Atlas HLB Surfactant Selector. Although these emulsifiers are useful in producing good water-in-oil emulsions, other emulsifiers may be used as long as they are capable of producing these emulsions. For instance, it has been found that certain high HLB surfactants are capable of producing stable water-in-oil emulsions. A typical low HLB emulsifier is sorbitan monooleate.

The polymers as produced by most manufacturing processes are in the form of powders or lump-like agglomerates of varying particle size. It is desirable that the particles, before being placed into the emulsion, be comminuted by grinding, abrading or the like so that their average particle size is less than 5 millimeters and preferably is within the range of 1–5 microns. After the powders have been comminuted, they may be dispersed into the water-in-oil emulsion by means of agitation provided by such devices as stirrers, shakers, homogenizers and the like. To be commercially practical, the amount of polymer in the emulsion should be at least 2 percent by weight. The invention contemplates using emulsions containing between 5 to 75 percent by weight with preferred emulsions having a polymer concentration within the range of 10 to 45 percent by weight. In some cases the starting emulsions are converted to suspensions due to the nature and the amount of the polymer present therein.

The method of preparing a water-in-oil emulsion by the use of a homogenization device is quite simple. Water is added with agitation to an oil-emulsifier mixture to make an emulsion. The finely divided polymer particles are then added to the emulsion with rapid agitation. The particle size of the polymer should be within the range of 1 micron to about 5 microns. This suspension of polymer particles in the emulsion is passed through a homogenizer. The amount of pressure necessary to produce a smooth emulsion varies in each experiment. The minimum pressure requirement is a function of the abrasiveness of the polymer, the concentration of the polymer, and the particle size of the polymer. In general, the pressure requirement is between 1,000 to 3,000 psi. However, depending upon those variables listed, the pressure requirement could be lower or exceed the stated range. A typical homogenizer device is the Manton-Gaulin type.

From a commercial standpoint it is beneficial that the polymer emulsions thus described be stable, yet at the same time contain relatively large amounts of polymers. One method of insuring that the polymers do not precipitate when dispersed in the emulsion is that the particle size of the polymer be as small as possible. Thus, polymers dispersed in the emulsifiers are quite stable when the particle size is within the range of 5 millimicrons up to about 5 microns. To produce particle sizes within these limitations, spray dryers with appropriate size nozzles may be used. It also is possible to prepare the polymer-containing emulsion of the water soluble vinyl addition polymers directly from the vinyl monomers from which these polymers are synthesized. Such polymer-containing emulsion may be synthesized by using the water-in-oil emulsion polymerization technique set forth in U.S. Pat. No. 3,284,393. The teachings of this patent comprise forming a water-in-oil emulsion of water soluble ethylenic unsaturated monomers. The emulsion is formed by utilizing a water-in-oil emulsifying agent. To this monomer is added a free radical type polymerization catalyst and then heat is applied under free radical-forming conditions to form water soluble polymer latices. The polymeric latices produced by this patent are relatively unstable and frequently must be treated with additional emulsifiers to render the products stable.

The placement of a surfactant into the water and subsequent mixing with the polymer emulsion in the Static Mixer causes the emulsion to rapidly invert and release the polymer in the form of an aqueous solution. When this technique is used to invert the polymer-containing emulsion the amount of surfactant present in the water may vary over a range of 0.01 to 50 percent based on polymer. Good inversion often occurs within the range of 1.0 to 10 percent based on polymer.

The preferred surfactants or activating agents are hydrophilic and are further characterized as being water soluble. Any hydrophilic type surfactant such ethoxylated nonyl phenols, ethoxylated nonyl phenol formaldehyde resin, dioctyl esters of sodium sulfosuccinate, and octyl phenol polyethoxyethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher amines like lauryl amine hydrochloride, and stearyl amine hydrobromide.

Any anionic, cationic, or nonionic compound can be used as the surfactant. Examples of suitable anionic surfactants are alkali metal, ammonium and amine soaps; the fatty acid part of such soaps contains preferably at least 16 carbon atoms because soaps based on lauric and myristic acids have a great tendency to develop abundant foam.

Other examples of suitable anionic surfactants are alkali metal salts of alkyl-aryl sulfonic acids, sodium dialkyl sulfosuccinate, sulfated or sulfonated oils, e.g., sulfated castor oil; sulfonated tallow, and alkali salts of short chain petroleum sulfonic acids.

Examples of suitable cationic surfactants are salts of long chain primary, secondary or tertiary amines, such as oleylamine acetate, cetylamine acetate, didodecylamine lactate, the acetate of aminoethylaminoethyl stearamide, dilauroyl triethylene tetramine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Examples of suitable nonionic surfactants are condensation products of higher fatty alcohols with ethylene oxide, such as the reaction product of oleyl alcohol with 10 ethylene oxide units; condensation products of alkylphenols with ethylene oxide, such as the reaction products of isooctylphenol with 12 ethylene oxide units; condensation products of higher fatty acid amides with five, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethylene glycol monorachidate, tricosaethylene glycol monobehenate, tricosaethylene glycol dibehenate, polyhydric alcohol partial higher fatty acid esters such as sorbitan tristearate, ethylene oxide condensation products of polyhydric alcohol partial higher fatty esters, and their inner anhydrides (mannitolanhydride, called Mannitan, and sorbitol-anhydride, called Sorbitan), such as glycerol monopalmitate reacted with 10 molecules of ethylene oxide, pentaerythritolmonooleate reacted with 12 molecules of ethylene oxide, sorbitan monostearate reacted with 10 to 15 molecules of ethylene oxide; long chain polyglycols in which one hydroxyl group is esterified with a higher fatty acid and the other hydroxyl group is etherified with a low molecular weight alcohol, such as methoxypolyethylene glycol 550 monostearate (550 meaning the average molecular weight of the polyglycol ether). A combination of two or more of these surfactants may be used; e.g., a cationic may be blended with a nonionic or an anionic with a nonionic.

Following is a list of suitable surfactants that could be used in the practice of this invention. Any water soluble surfactant could be used, but naturally some are more efficient than others. Useful surfactants include, but are not limited to: polyoxyethylene alkyl phenol, polyoxyethylene (10 mole) cetylether, polyoxyethylene alkyl-aryl ether, polyoxyethylene monolaurate, polyoxyethylene vegetable oil, polyoxyethylene sorbitan monolaurate, polyoxyethylene esters or mixed fatty and resin acids, polyoxyethylene sorbitol lanolin derivative, polyoxyethylene (12 mole) tridecyl ether, polyoxyethylene sorbitan esters of mixed fatty and resin acids, polyoxyethylene sorbitan monostearate, polyoxyethylene sorbitan monooleate, polyoxyethylene monostearate, polyoxyethylene (20 mole) stearyl ether, polyoxyethylene (20 mole) oleyl ether, polyoxyethylene (15 mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, potassium oleate, pure sodium lauryl sulfate, and quaternary ammonium derivatives such as N-cetyl N-ethyl morpholinium ethosulfate.

In addition to using the water soluble surfactants described above, other surfactants may be used such as silicones, clays and the like which are included as surfactants since, in certain instances, they tend to invert the emulsion even though they are not water soluble.

An important feature of the invention resides in the discovery that by adding water to the water-in-oil emulsion of the water soluble polymer or gum and passing the resultant composition through a Static Mixer or similar apparatus in which a confined stream follows a tortuous or winding path in contact with helical elements or other motionless elements with change of direction or even reversal of direction and by thus producing a sufficiently high turbulence in terms of a high Reynolds number incipient inversion of the water-in-oil emulsion to an oil-in-water emulsion can be obtained and the latter will break while releasing the polymer or gum in water to produce a solution shortly after, usually 5 to 25 minutes, the liquid polymer or gum leaves the mixer. Moreover, no additional agitation is necessary. When the polymer or gum dissolves in water a more viscous or thickened activated solution is formed. If this formation were to occur to any great extent in the mixer the pressure drop would increase thereby increasing the power requirements for forcing the stream through the mixer and possibly producing plugging. On the other hand, by carrying out the process in such a way that complete solution (and hence activation) with a substantial increase in viscosity does not occur until shortly after the liquid polymer or gum leaves the mixer, no plugging can occur, the power requirements are less and the process can be carried out smoothly and continuously in a minimum period of time.

The invention is hereby claimed as follows:

1. In the process of dissolving water soluble vinyl addition polymers and gums in water wherein a water-in-oil emulsion which contains finely divided water soluble vinyl addition polymer or gum is inverted in water whereby the water soluble vinyl addition polymer or gum is released into the water as a solution, the improvement which comprises adding water to said water-in-oil emulsion in sufficient amount so that the resultant composition has a viscosity approximating that of water alone, and passing a confined stream of the resultant composition with a Reynolds number of at least 50,000 for an average residence time less than one second in a tortuous or winding path under conditions sufficient to produce turbulence and to cause said water-in-oil emulsion to invert and to release said polymer or gum in water to produce an aqueous activated solution of said polymer or gum after said stream leaves said tortuous or winding path, said activated solution having a higher viscosity than the viscosity of said emulsion in said confined stream.

2. A process as claimed in claim 1 in which the viscosity of said aqueous activated solution of said polymer or gum is within the range of 2,000 to 2,500 cps at 25°C.

3. A process as claimed in claim 1 in which said inversion is carried out in the presence of a surfactant.

4. A process as claimed in claim 3 in which the quantity of said surfactant is within the range of 1.75 to 10 percent by weight of said polymer.

5. A process as claimed in claim 1 in which said polymer is an acrylamide-acrylic acid copolymer.

* * * * *